United States Patent Office 3,538,055
Patented Nov. 3, 1970

3,538,055
POLYESTERURETHANE ADHESIVES
Louis T. Camilleri, North Bellmore, and Manfred H. Huebner, Lindhurst, N.Y., assignors to Hooker Chemical Corporation, Niagara Falls, N.Y., a corporation of New York
No Drawing. Filed Nov. 29, 1967, Ser. No. 686,680
Int. Cl. C08g 22/10; C09d 3/48; B32b 27/40
U.S. Cl. 260—75                         13 Claims

ABSTRACT OF THE DISCLOSURE

A superior heat activatable polyurethane adhesive is produced by reacting components comprising (1) a polyester of hexanediol, an aliphatic dicarboxylic acid, and preferably an aromatic dicarboxylic acid, (2) an aliphatic diol and (3) a diphenyl diisocyanate in a proportion to provide about 95 to about 105 percent of isocyanato groups for the total number of hydroxyl and carboxyl groups. The polyurethane adhesive has good heat stability in the molten state, a low activation temperature, and high tensile and tear properties. The adhesive is suitable for bonding a broad range of substrates such as polyvinyl chloride, nylon, ABS polymer, polyurethanes, steel, aluminum, copper and wood.

BACKGROUND OF THE INVENTION

Heat activatable adhesives have been used in the past. However, some shortcomings of earlier adhesives have been: (a) limited heat stability in the molten state, (b) too short a period of tackiness after activation, (c) high temperatures were required to activate the adhesive, (d) tensile and tear properties were low, (e) bond strength of the adhesive to substrates has not been completely adequate, (f) the types of substrates which could be employed with any given adhesive has been limited, and (g) susceptible to attack by plasticizers and solvent type materials which may be present in the substrates. The adhesive compositions of the invention overcome the shortcomings of the prior art adhesive compositions.

Thus, it is an object of the invention to provide a superior, heat activatable polyurethane adhesive composition. It is another object of the invention to provide polyurethane adhesive compositions that have good heat stability in the molten state and low activation temperature, but which upon being cooled provide high bond strength between the substances to be adhered. It is an object of the invention to provide bonded articles wherein two or more surfaces are bonded with a polyurethane adhesive having high tensile strength and tear resistance. These and other objects will become apparent upon further consideration of the detailed specification.

SUMMARY OF THE INVENTION

In accordance with one aspect of this invention, there is provided a thermoplastic polyurethane adhesive product of components comprising (1) a polyester of components comprising hexanediol and an aliphatic dicarboxylic acid, (2) an aliphatic diol and (3) a diphenyl diisocyanate in a proportion to provide about 95 to about 105 percent of isocyanato groups for the total number of hydroxyl and carboxyl groups.

In accordance with a preferred aspect of the invention, the polyester utilized in the polyurethane composition is a polyester of components comprising hexanediol, an aliphatic dicarboxylic acid and an aromatic dicarboxylic acid.

In accordance with a further aspect of the invention, there are provided superior bonded articles wherein two or more surfaces are adhered together with the polyurethane adhesive composition of the invention.

The polyurethane adhesive compositions of the invention are heat activatable in that the adhesive is subjected to heat a some point in its use as an adhesives. (1) The adhesive can be applied between the surfaces to be adhered in the molten state and the laminated article is cooled whereby the polyurethane adhesive composition forms a strong bond with the surfaces to be adhered. (2) The adhesive can be coated on the substrate in the fluid state and then stored at room temperature until needed. Then the adhesive is activated by heating the coated surface to relatively low temperatures and laminated under pressure. (3) The adhesive can be applied to the substrate in the dry state as an unsupported film or dry powder, and then heated and laminated under pressure.

DESCRIPTION OF THE EMBODIMENTS

In the preparation of the polyester utilized in the polyurethane adhesive of the invention, hexanediol is used as the alcohol component because of the superior properties imparted to the adhesive composition. It has been found that polyesters based on butane diol of the prior art rapidly lose the property of tackiness a short time after being activated. This property is very important to a heat activatable adhesive composition. Compositions based on polyesters containing ethylene glycol as the alcohol component of polyurethane adhesives of the prior art have been found to require relatively high heat activation temperatures, and to exihibit short periods of tackiness.

The aliphatic dicarboxylic acids useful in the preparation of the polyester include acids such as adipic, succinic, methylsuccinic, tetramethylsuccinic, pimelic, glutaric, suberic, azeleic, sebacic, as well as unsaturated aliphatic dicarboxylic acids such as maleic, fumaric, itaconic, and the like. Also suitable are the corresponding anhydrides, such as maleic anhydride. Generally the aliphatic dicarboxylic compounds contain 4 to 10 carbon atoms, preferably 4 to 8 carbon atoms.

In a preferred aspect of the invention, a mixture of aliphatic and aromatic dicarboxylic acids is employed. Suitable aromatic dicarboxylic acids include acids such as phthalic, isophthalic, terephthalic, and various substituted phthalic acids such as tetrachlorophthalic acid, tetrabromophthalic acid. Also suitable are the corresponding anhydrides such as phthalic anhydride. In the compositions of the invention, the aromatic dicarboxylic compounds are generally employed in a ratio of 0 to 50 mole percent of the total polycarboxylic component, preferably in the ratio of about 20 to 40 mole percent of the total polycarboxylic component.

In the preparation of the polyester used in the invention, the alcohol and carboxylic components are mixed and heated at a temperature in the range of about 200 to 250 degrees centigrade. The reaction time can vary considerably but is generally in the range of 8 to 24 hours. The alcohol and carboxylic components are reacted in a ratio to provide about 115 to about 130 percent of hydroxyl groups based on the number of carboxyl groups present in the reaction mixture. The preferred polyesters of the invention have a final hydroxyl number in the range of about 50 to about 100 and a molecular weight of about 1,000 to about 2500. The acid number is generally in the range of 0 to 5. Low acid numbers are preferred to reduce the chance for subsequent reaction with isocyanate groups to produce carbon dioxide and to provide faster reaction rates with the isocyanate.

A free aliphatic diol is employed in preparing the polyurethane compositions of the invention. Suitable aliphatic diols include ethylene glycol, diethylene glycol, propylene glycol, dipropylene glycol, butanediol, hexanediol, octanediol, decanediol, and the like. The free glycol generally has 2 to 10 carbon atoms, preferably 4 to 6 carbon atoms. Mixtures of the glycols can also be employed. The incorporation of the free, unreacted glycol in the polyurethane composition results in a firmer urethane product that does not have a gummy characteristic. The cured adhesive has a much higher tensile strength. The glycol is generally employed in a ratio to provide about 2 to 15 parts by weight of unreacted glycol per 100 parts by weight of the polyester. Expressed in another way, the glycol is employed in a proportion sufficient to provide a hydroxyl number of about 100 to 200 for the mixture of polyester and unreacted diol. The hydroxyl number of the mixture is preferably about 135 to 165.

The organic polyisocyanate employed in the preparation of the polyurethane compositions of the invention are the diphenyl diisocyanates. Preferred are the diphenylmethane diisocyanates, including the various isomeric forms thereof, such as 4,4′-diphenylmethane diisocyanate and 2,4′-diphenylmethane diisocyanate. The organic diisocyanate is generally employed in a ratio sufficient to provide about 95 to 105 percent of isocyanato groups for a total number of hydroxyl and carboxyl groups present in the composition. Preferably the ratio is adjusted to provide about 98 to about 102 percent of isocyanato groups for the total number of hydroxyl and carboxyl groups present. The term carboxyl group is intended to include the carbonyl groups of carboxylic anhydrides or carboxylic acid halides present in the composition. The organic diisocyanate and the polyester and unreacted glycol are reacted at a temperature in the range of about 70 to 150 degrees centigrade, although higher temperatures up to about 200 degrees centigrade can be employed. The reaction time can vary considerably, but is generally in the range of 5 minutes to 15 hours, more usually at least about 4 hours.

Following preparation of the polyurethane composition, the product can be cooled to a solid material, which then can be pulverized or granulated to a particulate solid form and stored until ready for use. The polyurethane adhesive of the invention can be employed by spreading particles of the solid adhesive on at least one of the surfaces to be adhered, followed by joining the surfaces of the substrates to be adhered and then subjecting the composite laminate to sufficient heat to melt the adhesive composition. Thereafter, the laminated article is removed from the source of heat and allowed to cool. The resulting laminated article is adherently bonded together by the adhesive composition of the invention. Alternatively, the adhesive composition of the invention can be heated to above its melting point, which is generally above about 400 degrees Fahrenheit preferably in the range of about 400 to 450 degrees Fahrenheit. Then, the molten adhesive can be applied to the surfaces to be adhered, the surfaces of the substrates to be adhered are joined together and the composite, laminated article is allowed to cool. The polyurethane adhesive is generally utilized at a temperature of about 425 to 475 degrees Fahrenheit. The cooled laminated article generally achieves its ultimate bond strength in about one day or so following application and cooling. The adhesive composition in the molten state has good heat stability and the adhesive has a long residual period of tackiness after being brought to the activation temperature.

A wide variety of substrates can be adhered with the adhesive composition of the invention. These include polymeric compositions such as the homopolymers and copolymers of unsaturated aliphatic, alicyclic and aromatic hydrocarbons, i.e., polyethylene, polypropylene, polystyrene, copolymers of ethylene and other olefins such as ethylenebutene copolymers; polyvinyl chloride; polyamides, particularly long chain synthetic polymeric amides containing recurring carbonamide groups as an integral part of the main polymer chain; polyester resins such as unsaturated polyesters of dibasic acids and dihydroxy compounds; polymers of acrylate and methacrylate esters; cellulose derivatives such as cellulose acetate, cellulose nitrate, and the like; epoxy resins; polyurethanes; phenolic resins such as phenolaldehyde resins; rubbers such as natural rubber, synthetic polyisoprene, chlorinated rubber, polybutadiene, butadiene-acrylonitrile rubber, butadiene-styrene rubber and butyl rubber; neoprene rubber; polysulfides; thermoplastic polymers of bisphenols and epichlorohydrin; graft copolymers of polymers of unsaturated hydrocarbons and an unsaturated monomer, such as graft copolymers of polybutadiene, styrene and acrylonitrile, commonly called ABS resins; ABS-polyvinyl chloride polymers, and acrylic polyvinyl chloride polymers. Other suitable substrates which can be adhered include metals such as steel, copper, brass, aluminum, zinc, and many others; cellulosic materials such as wood and wood products, cardboard and paper goods, cloth; and ceramic materials, such as porcelain, tile and the like.

The invention is illustrated by the following examples, which are not intended to limit the scope of the invention. Unless otherwise indicated, all parts are by weight and temperatures are degrees centigrade.

Example 1

A hexanediol adipate polyester was prepared by mixing 380 parts by weight of 1,6-hexanediol and 400 parts of adipic acid. The reaction mixture was heated for 14 hours at a temperature of 230 degrees centigrade. The hydroxyl number of the resulting polyester was 75. Thereafter 374.4 parts of the thus prepared polyester and 25.6 parts of 1,4-butanediol were mixed until homogeneous. The hydroxyl number was measured and found to be 150. Thereafter 22.5 parts of the polyester-diol mixture were mixed with 7.5 parts of 4,4′-diphenylmethane diisocyanate and the mixture was poured into shallow metal trays coated with a mold release agent. The trays were placed in an oven operated at 100 degrees centigrade for about 8 hours to produce the polyurethane product. The trays were removed from the oven and the polyurethane product was cooled and then granulated.

The characteristics of the polyurethane product were tested by milling a polyurethane film. The film was found to have the following properties when tested 48 hours after milling:

100% modulus @ 23° C. pounds per square inch __ 750
300% modulus @ 23° C. pounds per square inch __ 2,000
Tensile strength @ 23° C. pounds per square inch _ 7,000
Elongation, percent @ 23° C. _____ 650
Graves tear strength @ 23° C. _____ 430

Example 2

A hexanediol adipate isophthalate polyester was prepared by mixing 347 parts by weight of 1,6-hexanediol, 255 parts of adipic acid and 136 parts of isophthalic acid. The reaction mixture was heated for about 18 hours at a temperature of 450 degrees Fahrenheit. The hydroxyl number of the resulting polyester was 75 and the molecular weight was 1500. Thereafter 210 parts of the thus prepared polyester and 14.4 parts of 1,4-butanediol were mixed until homogenous. The hydroxyl number was measured and found to be 150. Thereafter the resulting polyester-diol mixture at about 90° C. was mixed with 7.5 parts of 4′,4′-diphenylmethane diisocyanate at about 90° C. and the mixture was poured into shallow metal trays coated with a mold release agent. The trays were placed in an oven operated at 100 degrees centigrade for about 8 hours to produce the polyurethane product. The trays were removed from the oven and the polyurethane product was cooled and then granulated.

The characteristics of the polyurethane product were tested by milling a polyurethane film. The film was found to have the following properties when tested 48 hours after milling:

| | |
|---|---|
| 100% modulus @ 23° C. p.s.i. | 630 |
| 200% modulus @ 23° C. p.s.i. | 940 |
| 300% modulus @ 23° C. p.s.i. | 1540 |
| 400% modulus @ 23° C. p.s.i. | 3900 |
| Tensile strength, p.s.i. | 7,000 |
| Elongation, percent | 500 |
| Graves tear strength | 325 |

Example 3

The polyurethane adhesive of Example 1 is applied in the form of solid particles to one surface of a steel plate. A second steel plate is laid on top of the adhesive particles. The composite is clamped with a C-clamp an placed in an oven at 450 degrees Fahrenheit for 10 minutes. The bonded steel plates are removed from the oven, cooled and stored for 2 days. At the end of this time the steel plates are found to be strongly bonded together.

Example 4

A portion of the polyurethane adhesive of Example 2 is heated to a temperature of 450 degrees Fahrenheit and applied to a piece of walnut wood. A second piece of walnut wood is immediately applied to the adhesive surface and the pieces of wood are firmly pressed together. After 2 days, when an attempt is made to pull the bonded wood pieces apart it is found that the wood surface of one of the wood pieces is torn off but the adhesive is left intact. This clearly demonstrates the strength of the bond.

Example 5

A portion of the polyurethane adhesive of Example 2 is heated to a temperature of 450 degrees Fahrenheit and applied to a film of polyvinyl chloride having a thickness of 20 mils. A second film of polyvinyl chloride is immediately applied to the adhesive surface and the plastic films are firmly pressed together between metal platens. The polyvinyl choride films are found to be strongly bonded together.

Various changes and modifications can be made in the method and compositions of the invention, certain preferred forms of which have been described herein, without departing from the spirit and scope of the invention.

We claim:

1. A thermoplastic polyurethane adhesive product of components comprising (1) a polyester of components comprising 1,6-hexanediol and an aliphatic dicarboxylic compound, (2) an aliphatic diol, and (3) a diphenyl diisocyanate in a proportion to provide about 95 to about 105 percent of isocyanato groups for the total number of hydroxyl and carboxyl groups present in the composition.

2. The polyurethane product of claim 1 wherein the aliphatic dicarboxylic compound is an aliphatic dicarboxylic acid of 4 to 10 carbon atoms and the aliphatic diol has 2 to 10 carbon atoms.

3. The polyurethane product of claim 2 wherein the aliphatic dicarboxylic acid is adipic acid, the aliphatic diol is 1,4-butanediol and the diphenyl diisocyanate is diphenylmethane diisocyanate in a proportion to provide about 98 to about 102 percent of isocyanato groups for the total number of hydroxyl and carboxyl groups present in the composition.

4. A thermoplastic polyurethane adhesive product of components comprising (1) a polyester of components comprising 1,6-hexanediol, an aliphatic dicarboxylic compound, and an aromatic dicarboxylic compound, said aromatic dicarboxylic compound being present in a proportion of 20 to 40 mole percent of the total carboxylic components present in the polyester, (2) an aliphatic diol, and (3) a diphenyl diisocyanate in a proportion to provide about 95 to about 105 percent of isocyanato groups for the total number of hydroxyl and carboxyl groups present in the composition.

5. The polyurethane product of claim 4 wherein the aliphatic dicarboxylic compound is an acid of 4 to 10 carbon atoms and the aliphatic diol has 2 to 10 carbon atoms.

6. The polyurethane product of claim 5 wherein the aliphatic dicarboxylic acid is adipic acid, the aromatic dicarboxylic compound is isophthalic acid, the aliphatic diol is 1,4-butanediol, and the diphenyl diisocyanate diphenylmethane diisocyanate is in a proportion sufficient to provide about 98 to about 102 percent of isocyanato groups for the total number of hydroxyl and carboxyl groups present in the composition.

7. A bonded article comprising two or more substrates, the surfaces of which are bonded together by a thermoplastic polyurethane adhesive product of components comprising (1) a polyester of components comprising 1,6-hexanediol and an aliphatic dicarboxylic compound, (2) an aliphatic diol and (3) a diphenyl diisocyanate in a proportion to provide about 95 to about 105 percent of isocyanato groups for the total number of hydroxyl and carboxyl groups present in the composition.

8. The bonded article of claim 7 wherein the aliphatic dicarboxylic compound is adipic acid, the aliphatic diol is 1,4-butanediol, and the diphenyl diisocyanate is diphenylmethane diisocyanate in a proportion sufficient to provide about 98 to about 102 percent of isocyanato groups for the total number of hydroxyl and carboxyl groups present in said product.

9. A bonded article comprising two or more substrates, the surfaces of which are bonded together by a thermoplastic polyurethane adhesive product of components comprising (1) a polyester of components comprising 1,6-hexanediol, an aliphatic dicarboxylic compound, and an aromatic dicarboxylic compound, said aromatic dicarboxylic compound being present in a proportion of 20 to 40 mole percent of the total carboxylic components present in the polyester, (2) an aliphatic diol, and (3) a diphenyl diisocyanate in a proportion to provide about 95 to about 105 percent of isocyanato groups for the total number of hydroxyl and carboxyl groups present in the composition.

10. The bonded article of claim 9 wherein the aliphatic dicarboxylic compound is adipic acid, the aromatic dicarboxylic compound is isophthalic acid, the aliphatic diol is 1,4-butanediol, the diphenyl diisocyanate is diphenylmethane diisocyanate in a proportion to provide about 98 to about 102 percent of isocyanato groups for the total number of hydroxyl and carboxyl groups present in said product.

11. The bonded article of claim 7 wherein the substrates are polyvinyl chloride.

12. The bonded article of claim 7 wherein the substrates are wood.

13. The bonded article of claim 7 wherein the substrates are steel.

References Cited

UNITED STATES PATENTS

| | | | |
|---|---|---|---|
| 2,769,826 | 11/1956 | Yoho | 260—407 |
| 2,801,648 | 8/1957 | Anderson et al. | 138—74 |
| 2,953,489 | 9/1960 | Young | 154—139 |
| 3,008,917 | 11/1961 | Park et al. | 260—45.4 |
| 3,015,650 | 1/1962 | Schollenberger | 260—75 |
| 3,202,728 | 8/1965 | Kohn | 260—858 |
| 3,252,848 | 5/1966 | Borsellino | 156—307 |

(Other references on following page)

UNITED STATES PATENTS

| | | | |
|---|---|---|---|
| 3,290,208 | 12/1966 | Lewis et al. | 161—190 |
| 3,317,481 | 5/1967 | Youker | 260—77.5 |
| 2,741,800 | 4/1956 | Brockway | 18—58 |
| 2,753,219 | 7/1956 | Brockway | 260—30.6 |

FOREIGN PATENTS 1,016,120   1/1966   Great Britain.

OTHER REFERENCES

Polyurethanes Dombrow, 2nd edition, Reinhold, New York (1965), pp. 161–171.

Vieweg-Hoechtlen, Polyurethanes (vol. VII of Kunstoff-Handbuch, Carl Hansen Verlag, Muenchen (1966)) pp. 721–733.

DONALD E. CZAJA, Primary Examiner

H. S. COCKERAM, Assistant Examiner

U.S. Cl. X.R.

161—190, 213, 247, 270